United States Patent
Gerber et al.

[11] Patent Number: 5,189,127
[45] Date of Patent: Feb. 23, 1993

[54] CROSSLINKED POLYIMIDES PREPARED FROM N-(3-ETHYNYLPHENYL)MALEIMIDE

[75] Inventors: Margaret K. Gerber, Cincinnati, Ohio; Terry L. St. Clair, Poquoson, Va.

[73] Assignee: The United States of America as represented by the Administrator of the National Aeronautics and Space Administration, Washington, D.C.

[21] Appl. No.: 801,867

[22] Filed: Dec. 3, 1991

Related U.S. Application Data

[63] Continuation-in-part of Ser. No. 528,666, May 18, 1990, abandoned.

[51] Int. Cl.$^5$ .............................................. C08F 222/40
[52] U.S. Cl. ..................................... 526/262; 526/285; 528/322
[58] Field of Search ................. 526/262, 285; 528/322

[56] References Cited

U.S. PATENT DOCUMENTS

| | | |
|---|---|---|
| 4,861,882 | 8/1989 | Hergenrother et al. ............ 544/216 |
| 4,889,912 | 12/1989 | Hergenrother et al. ............ 528/125 |
| 4,937,356 | 6/1990 | Hergenrother et al. ............ 548/549 |

*Primary Examiner*—Harold D. Anderson
*Attorney, Agent, or Firm*—George F. Helfrich

[57] ABSTRACT

The compound N-(3-ethynylphenyl)maleimide (NEPMI) was used to prepare thermally stable, glassy polyimides which did not exhibit glass transition temperatures below 500° C. NEPMI was blended with the maleimide of methylene dianiline (BMI) and heated to form the polyimide. NEPMI was also mixed with Thermid 600 ®, a commercially available bisethynyl oligomeric material, and heated to form a thermally stable, glassy polyimide. Lastly, NEPMI was blended with both BMI and Thermid 600 ® to form thermally stable, glassy polyimides.

10 Claims, No Drawings

CROSSLINKED POLYIMIDES PREPARED FROM N-(3-ETHYNYLPHENYL)MALEIMIDE

ORIGIN OF THE INVENTION

The invention described herein was made in the performance of work under a NASA contract and is subject to the provision of Section 305 of the National Aeronautics and Space Act of 1958, as amended, Public Law 85-568 (72 Stat. 435; 42 USC 2457).

CROSS-REFERENCE

This application is a continuation-in-part of copending application Ser. No. 528,666, filed May 18, 1990, now abandoned.

BACKGROUND OF THE INVENTION

1. Field of the Invention

The present invention relates generally to polyimides which are suitable for high temperature applications as a result of their high or nondetectable glass transition temperatures and their high thermooxidative stabilities. It relates particularly to three types of polyimides which are prepared from monomers containing carbon-carbon double and/or triple bonds, in particular N-(3-ethynylphenyl)maleimide (NEPMI).

2. Description of Related Art

Polymers prepared from the reaction of organic compounds containing pendant ethynyl groups or organic oligomers containing pendant ethynyl groups are well known for their thermooxidative stability and exceptionally high glass transition temperatures. Likewise, organic compounds or oligomers containing activated carbon-carbon double bonds and imide moieties (i.e. maleimides) can be used to prepare thermally stable polymers.

Hergenrother et al. (U.S. Pat. No. 4,889,912 and U.S. Pat. No. 4,937,356) prepared acetylene terminated aspartimides by reacting an aromatic diamine with NEPMI. These acetylene terminated aspartimides were blended with acetylene terminated polyarylene ethers or sulfone oligomers to yield polymers with improved mechanical properties such as fracture toughness.

Hergenrother et al. (U.S. Pat. No. 4,861,882) also prepared ethynyl terminated imidothioethers by reacting a dimercaptan with NEPMI. These ethynyl terminated imidothioethers were then blended with other ethynyl terminated oligomers to produce resin blends which are useful as adhesives, coatings, and films. The glass transition temperatures of these blends ranged from 193°–245° C.

SUMMARY OF THE INVENTION

The compound N-(3-ethynylphenyl)maleimide (NEPMI) has the following structural formula:

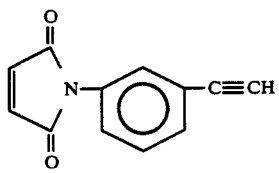

This monomer is highly reactive due to its two types of unsaturation (double and triple bonded carbons). The ethynyl group allows for copolymerization with other ethynyl-containing monomers and oligomers and the maleimide group allows for copolymerization with maleimide monomers and oligomers.

The highly reactive nature of NEPMI is demonstrated when it is heated past its melting point of 130° C. Depending on the heating rate, the liquid form of NEPMI exhibits an intense exotherm in the region of 155°–248° C. This exotherm is so strong that active cooling is necessary in order to dissipate the heat. The resulting polymers do not exhibit glass transitions below 500° C. These characteristics are also demonstrated by compounds having the following general structural formula:

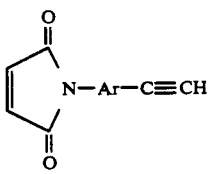

where Ar is any aromatic moiety.

An object of the present invention is to provide high temperature polyimides by reacting NEPMI with bisethynyl-containing monomers and/or oligomers and heating them to a temperature where they react.

Another object is to provide high temperature polyimides by reacting NEPMI with bismaleimide monomers and/or oligomers and heating them to a temperature where they react.

Another object is to provide high temperature polyimides by reacting NEPMI with mixtures of bisethynyl and bismaleimide monomers and/or oligomers and heating them to a temperature where they react.

DESCRIPTION OF THE PREFERRED EMBODIMENTS

EXAMPLE 1

High temperature polymers were prepared by heating 5–10 mg samples of NEPMI in an open pan at heating rates of 1° C./min., 10° C./min., 20° C./min., 50° C./min., and 100° C./min. using a DuPont 1090 Thermal Analyzer. Table 1 lists the melt onset, exotherm temperature and intensity, and temperature for 5% weight loss in air for each polymer prepared. For comparison, samples of the maleimide of methylene dianiline (BMI), and samples of Thermide 600 ®, a bisethynyl oligomeric compound available from National Starch, were heated at heating rates of 10° C./min. and 50° C./min. using the same thermal analyzer. These results are also recorded in Table 1.

TABLE 1

| | Pure Reactants | | | |
|---|---|---|---|---|
| Sample | Heating Rate | Melt Onset (°C.) | Exotherm Temp. (°C.) | Exotherm Intensity | Temp. 5% Wt. loss in air |
| NEPMI | 1° C./min | 130.5 | 155 | low | 405° C. |
| NEPMI | 10° C./min | 131.2 | 200 | low | 412° C. |
| NEPMI | 20° C./min | 131.7 | 215 | moderate | 420° C. |
| NEPMI | 50° C./min | 135.7 | 244 | high | 410° C. |
| NEPMI | 100° C./min | 135.2 | 248 | high | 412° C. |
| BMI | 10° C./min | 151.7 | 246 | very low | 420° C. |
| BMI | 50° C./min | 154.7 | 246 | very low | 410° C. |
| Thermid 600 ® | 10° C./min | Not observed | 250 | low | 508° C. |
| Thermid | 50° C./min | Not | 297 | moderate | 503° C. |

TABLE 1-continued

| Sample | Heating Rate | Pure Reactants Melt Onset (°C.) | Exotherm Temp. (°C.) | Exotherm Intensity | Temp. 5% Wt. loss in air |
|---|---|---|---|---|---|
| 600 ® | | observed | | | |

EXAMPLE 2

NEPMI was blended in various ratios with the maleimide of methylene dianiline (BMI) and thermally polymerized as described in Example 1. BMI has the following structural formula:

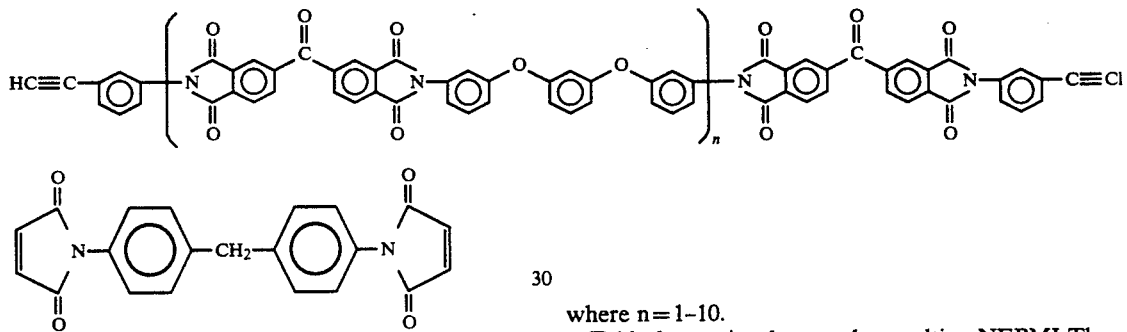

Table 2 shows the heating rate, melt temperature, exotherm temperature, temperature of 5% weight loss in air, and glass transition temperature (Tg) for the resulting polymer blends and is compared to BMI and Thermid 600 ® control polymers. It is evident from the data that the presence of NEPMI offers a significant improvement in the Tg of these polymers.

TABLE 2

| Polymers from NEPMI-BMI Blends | | | | | |
|---|---|---|---|---|---|
| Ratio of NEPMI/ BMI | Heating Rate | Melt Temp. (°C.) | Exotherm Temp. (°C.) | Temp. 5% wt. loss (°C.) | Tg (°C.) |
| 90/10 | 10° C./min | 122.8 | 210 | 418 | >500 |
| 90/10 | 50° C./min | 131.3 | 240 | 432 | >500 |
| 80/20 | 10° C./min | 107.9 120 | 208 | 415 | >500 |
| 80/20 | 50° C./min | 110 135 | 250 | 410 | >500 |
| 70/30 | 10° C./min | 109.4 120 | 214 | 430 | >500 |
| 70/30 | 50° C./min | 111.9 133 | 250 | 420 | >500 |
| 60/40 | 10° C./min | 109.4 126 | 211 | 410 | >500 |
| 60/40 | 50° C./min | 113 | 251 | 420 | >500 |
| 50/50 | 10° C./min | 109.9 | 212 | 442 | >500 |
| 50/50 | 50° C./min | 113 | 248 | 418 | >500 |
| 80/20 | 10° C./min | 110 129 | 224 | 428 | >500 |
| 80/20 | 50° C./min | 113 137 | 252 | 418 | >500 |
| BMI | 10° C./min | 151.7 | 246 | 420 | 290 |
| Thermid 600 ® | 10° C./min | None | 250 | 508 | 305 |

Although BMI was used in this example, other bis-maleimides can also be used which have the following structure:

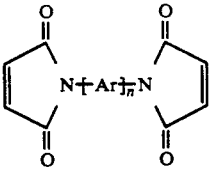

where Ar is any aromatic moiety and n=1-50.

EXAMPLE 3

NEPMI was also blended in various ratios with the ethynyl-containing oligomeric compound Thermid 600 ® and thermally polymerized as described in Example 1. Thermid 600 ® has the following structural formula:

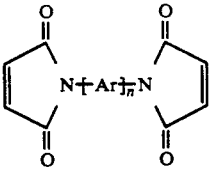

where n=1-10.

Table 3 contains data on the resulting NEPMI-Thermid 600 ® blends as compared to BMI and Thermid 600 ® control polymers.

TABLE 3

| Polymers from NEPMI-Thermid 600 ® | | | | | |
|---|---|---|---|---|---|
| Ratio of NEPMI/ Thermid 600 ® | Heating Rate | Melt Temp. (°C.) | Exotherm Temp. (°C.) | Temp. of 5% wt. loss (°C.) | Tg (°C.) |
| 90/10 | 10° C./min | 127.6 | 210 | 415 | >500 |
| 90/10 | 50° C./min | 131.7 | 246 | 438 | >500 |
| 80/20 | 10° C./min | 127.1 | 218 | 432 | >500 |
| 80/20 | 50° C./min | 133.1 | 254 | 396 | >500 |
| 70/30 | 10° C./min | 128 | 218 | 435 | >500 |
| 70/30 | 50° C./min | 132 | 252 | 440 | >500 |
| 60/40 | 10° C./min | 127 | 228 | 378 | >500 |
| 60/40 | 50° C./min | 129 | 276 | 432 | >500 |
| 50/50 | 10° C./min | 128 | 230 | 410 | >500 |
| 50/50 | 50° C./min | 130 | 278 | 462 | >500 |
| 20/80 | 10° C./min | 128 | 246 | 455 | >500 |
| 20/80 | 50° C./min | 130 | 288 | 500 | >500 |
| BMI | 10° C./min | 151.7 | 246 | 420 | 290 |
| Thermid 600 ® | 10° C./min | Not Observed | 250 | 508 | 305 |

Although Thermid 600 ® was used in this example, other bisethynyl terminated oligomers known to those skilled in the art may also be employed. These compounds have the following general structure:

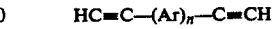

where Ar is any aromatic moiety and n=1-50.

EXAMPLE 4

Polymers were made by heating blends of NEPMI, Thermid 600 ®, and BMI in various ratios. The data is presented in Table 4 and compared to BMI and Thermid 600 ® control polymers.

TABLE 4

| Ratio of NEPMI/BMI/Thermid 600 ® | Heating Rate | Melt Temp. (°C.) | Ternary Blends Exotherm Temp. (°C.) | Temp. of 5% weight loss (°C.) | Tg (°C.) |
| --- | --- | --- | --- | --- | --- |
| 1/1/1 | 10° C./min | 105 | 230 | 468 | >500 |
| 1/1/1 | 50° C./min | 114 | 260 | 458 | >500 |
| 1/0.5/3 | 10° C./min | 111 | 247 | 450 | >500 |
| 1/0.5/3 | 50° C./min | 125 | 290 | 482 | >500 |
| 1/3/2 | 10° C./min | 107 | 236 | 462 | >500 |
| 1/3/2 | 50° C./min | 116 | 256 | 450 | >500 |
| BMI | 10° C./min | 151.7 | 246 | 420 | 290 |
| Thermid 600 ® | 10° C./min | None | 250 | 508 | 305 |

The utility of these polymers is dependent on their ability to be formed from monomers and oligomers which melt and polymerize without the evolution of volatiles. The presence of NEPMI in the polymer results in an increase in crosslink density, and thus, they do not exhibit a glass transition (Tg) below 500° C. These polymers are useful as high temperature composite matrix resins for supersonic aircraft structures and mainframe and engine applications where high Tg is a requirement.

What is claimed as new and desired to be secured by Letters Patent of the United States is:

1. A thermally stable, glassy, crosslinked polymer prepared from a monomer composition consisting essentially of at least one ethynyl imide (I) having the following general structural formula:

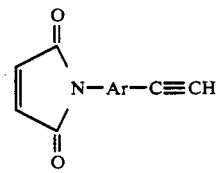
(I)

where Ar is any aromatic moiety; and a member selected from the group consisting of:

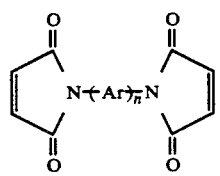
(II)

and

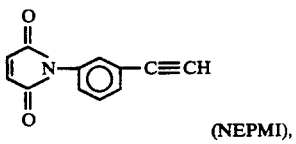
(NEPMI), and $$HC\equiv C-(Ar)_n-C\equiv CH \quad (III)$$

where Ar is any aromatic moiety and n=1-50; and said polymer has a glass transition temperature of at least 500° C.

2. A thermally stable, glassy, crosslinked polymer according to claim 1, wherein (I) has the following structural formula:

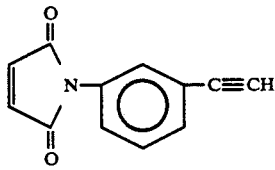
(NEPMI).

3. A thermally stable, glassy, crosslinked according to claim 1, wherein (II) has the following structural formula:

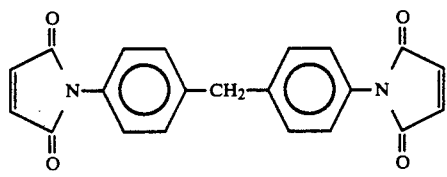
(BMI).

4. A thermally stable, glassy, crosslinked polymer according to claim 3, wherein the ratio of NEPMI to BMI is between about 90:10 and 20:80.

5. A thermally stable, glassy, crosslinked polymer according to claim 1, wherein (III) has the following structural formula:

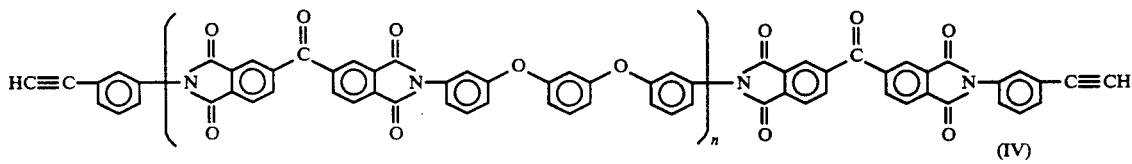
(IV)

where n=1-10.

6. A thermally stable, glassy, crosslinked polymer according to claim 5, wherein the ratio of NEPMI to (IV) is between about 90:10 and 20:80.

7. A thermally stable, glassy, crosslinked polymer according to claim 1, wherein (I), (II), and (III) have the following structural formulas, respectively:

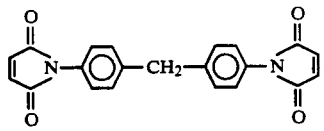
(BMI),
and
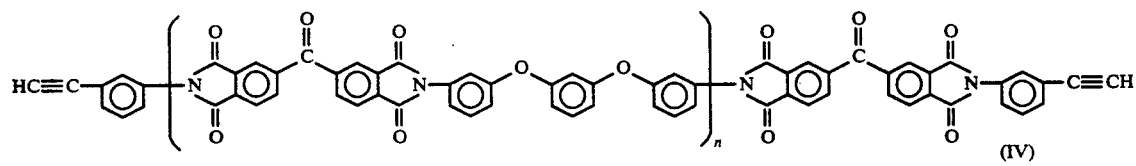
where n=1–10.
8. A thermally stable, glassy, crosslinked polymer according to claim 7, wherein the ratio of NEPMI to BMI to (IV) is 1:1:1.
9. A thermally stable, glassy, crosslinked polymer according to claim 7, wherein the ratio of NEPMI to BMI to (IV) is 1:0.5:3.
10. A thermally stable, glassy, crosslinked polymer according to claim 7, wherein the ratio of NEPMI to BMI to (IV) is 1:3:2.
* * * * *